(12) United States Patent
Kuo et al.

(10) Patent No.: US 11,012,653 B2
(45) Date of Patent: May 18, 2021

(54) IMAGE SENSOR APPARATUS AND METHOD CAPABLE OF RAPIDLY READING OUT AND PROCESSING PIXEL VOLTAGES OF PIXEL ARRAY

(71) Applicant: PixArt Imaging Inc., Hsin-Chu (TW)

(72) Inventors: Chia-Chi Kuo, Hsin-Chu (TW); Jui-Te Chiu, Hsin-Chu (TW); Han-Chi Liu, Hsin-Chu (TW); Wei-Chia Huang, Hsin-Chu (TW); Yi-Cheng Chiu, Hsin-Chu (TW); Kuan Tang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/601,541

(22) Filed: Oct. 14, 2019

(65) Prior Publication Data
US 2021/0112215 A1    Apr. 15, 2021

(51) Int. Cl.
*H04N 5/376*  (2011.01)
*H04N 5/372*  (2011.01)
*H04N 5/3745* (2011.01)

(52) U.S. Cl.
CPC ....... *H04N 5/3765* (2013.01); *H04N 5/37206* (2013.01); *H04N 5/37455* (2013.01)

(58) Field of Classification Search
CPC ............. H04N 5/3765; H04N 5/37455; H04N 5/37206
See application file for complete search history.

(56) References Cited

U.S. PATENT DOCUMENTS

| 2012/0199724 A1* | 8/2012 | Nomura | H04N 5/378 250/208.1 |
| 2016/0150171 A1* | 5/2016 | Raynor | H04N 5/3452 348/302 |
| 2019/0165802 A1* | 5/2019 | Sekita | H04N 5/378 |

* cited by examiner

*Primary Examiner* — Yogesh K Aggarwal
(74) *Attorney, Agent, or Firm* — Winston Hsu

(57) ABSTRACT

A method of image sensor apparatus includes: providing pixel array having pixel units arranged in M rows and N columns; providing N parallel column readout circuits each being arranged for reading out pixel data of one corresponding column; disposing a horizontal shift register in row direction coupled to the N parallel column readout circuits, to receive a pulse signal and a clock signal, sequentially shift a phase of the pulse signal according to the clock signal, and scan a corresponding column according to the shifted phase of the pulse signal; and using a column select circuit having N latches to receive a power down digital control signal transmitted from a microcontroller wherein the power down digital control signal is used to disable at least one column readout circuit to enable and select a portion of the set of N parallel column readout circuits.

14 Claims, 4 Drawing Sheets

Skip2 mode

Skip4 mode

IMAGE SENSOR APPARATUS AND METHOD CAPABLE OF RAPIDLY READING OUT AND PROCESSING PIXEL VOLTAGES OF PIXEL ARRAY

BACKGROUND OF THE INVENTION

1. Field of the Invention

The invention relates to an image sensor architecture, and more particularly to a pixel voltage readout architecture of an image sensor device and corresponding method.

2. Description of the Prior Art

Generally speaking, in a conventional column readout circuit architecture for a pixel array, all the column readout circuits are arranged to operate based on the same waveform of the same power down control signal. If the conventional column readout circuit architecture needs to support and implement the function of skipping some column(s), it is necessary for the conventional column readout circuit architecture to generate and output corresponding waveforms of corresponding power down control signals respectively for the different column readout circuits. The control will become more complicated if pixel voltages of only the columns falling within a window of interest are needed to be processed. Usually, the conventional column readout circuit architecture may read out and process pixel voltages of all the columns in the analog domain to generate digital pixel values at the first and then to process only the digital pixel values which are interest in the digital domain. This conventional method cannot save more power.

SUMMARY OF THE INVENTION

Therefore one of the objectives of the invention is to provide an image sensor apparatus and corresponding method, to solve the above-mentioned problems.

According an embodiment of the invention, an image sensor apparatus is disclosed. The apparatus comprises a pixel array, a set of N parallel column readout circuits, a horizontal shift register, and a column select circuit. The pixel array comprises a plurality of pixel units being arranged in M rows and N columns. The set of N parallel column readout circuits respectively correspond to the N columns each column readout circuit being arranged for reading out pixel data of one corresponding column. The horizontal shift register is disposed in a row direction, and is coupled to the set of N parallel column readout circuits, and is configured for receiving a pulse signal and a clock signal, sequentially shifting a phase of the pulse signal according to the clock signal, and for scanning a corresponding column according to the shifted phase of the pulse signal. The column select circuit having N latches is coupled to the set of N parallel column readout circuits. Each of the N latches respectively corresponds to one of the N parallel column readout circuits. The column select circuit is used for receiving a power down digital control signal transmitted from a microcontroller disposed within the image sensor apparatus, and the power down digital control signal is used to disable at least one column readout circuit to enable and select a portion of the set of N parallel column readout circuits.

According to an embodiment of the invention, a method applied in an image sensor apparatus is disclosed. The method comprises: providing a pixel array comprising a plurality of pixel units and arranged in M rows and N columns; providing a set of N parallel column readout circuits respectively corresponding to the N columns, each column readout circuit being arranged for reading out pixel data of one corresponding column; disposing a horizontal shift register in a row direction coupled to the set of N parallel column readout circuits, to receive a pulse signal and a clock signal, sequentially shift a phase of the pulse signal according to the clock signal, and scan a corresponding column according to the shifted phase of the pulse signal; and using a column select circuit having N latches coupled to the set of N parallel column readout circuits, to receive a power down digital control signal transmitted from a microcontroller disposed within the image sensor apparatus, wherein each of the N latches respectively correspond to one of the N parallel column readout circuits, and the power down digital control signal is used to disable at least one column readout circuit to enable and select a portion of the set of N parallel column readout circuits.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
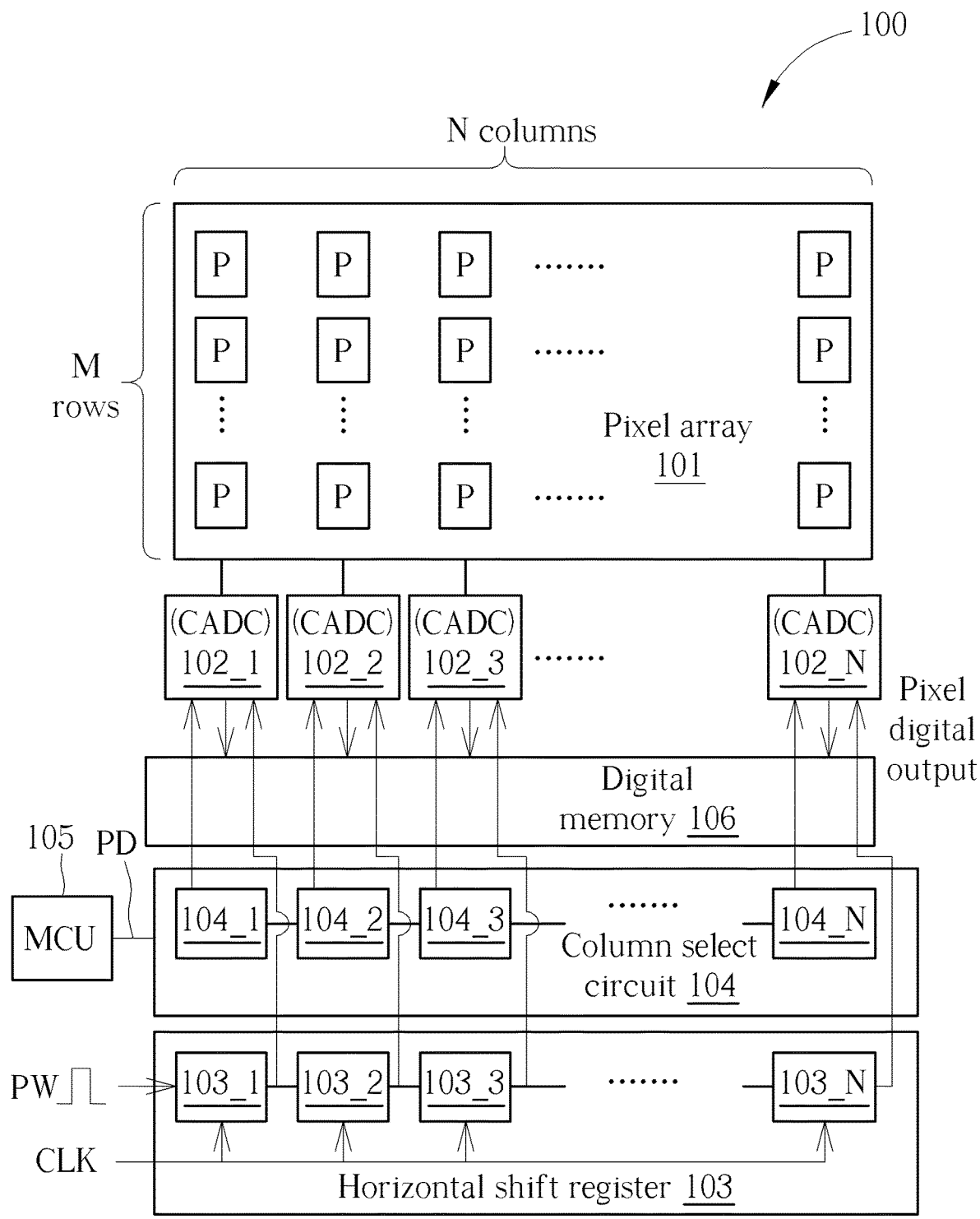
FIG. 1 is a block diagram of an image sensor apparatus 100 according to an embodiment of the invention.

FIG. 1 is a block diagram of an image sensor apparatus 100 according to an embodiment of the invention. The image sensor apparatus 100 comprises a pixel array 101, a set of N parallel column readout circuits 102_1-102_N, a horizontal shift register 103, a column select circuit 104, a microcontroller (MCU) 105, and a digital memory 106.

The pixel array 101 comprises a plurality of pixel units (represented by blocks 'P') which are arranged in M rows and N columns. For example, the pixel array 101 has 1280×720 pixels (i.e. HD (high definition) resolution) wherein M is equal to 1280 and N is equal to 720 (but not limited). For another example of small array, the pixel array 101 may have 32×32 pixels or 64×64 pixels. In addition, the pixel array 101 can support different resolutions such as VGA/HVGA/QVGA/FHD or others.

Figure 2:
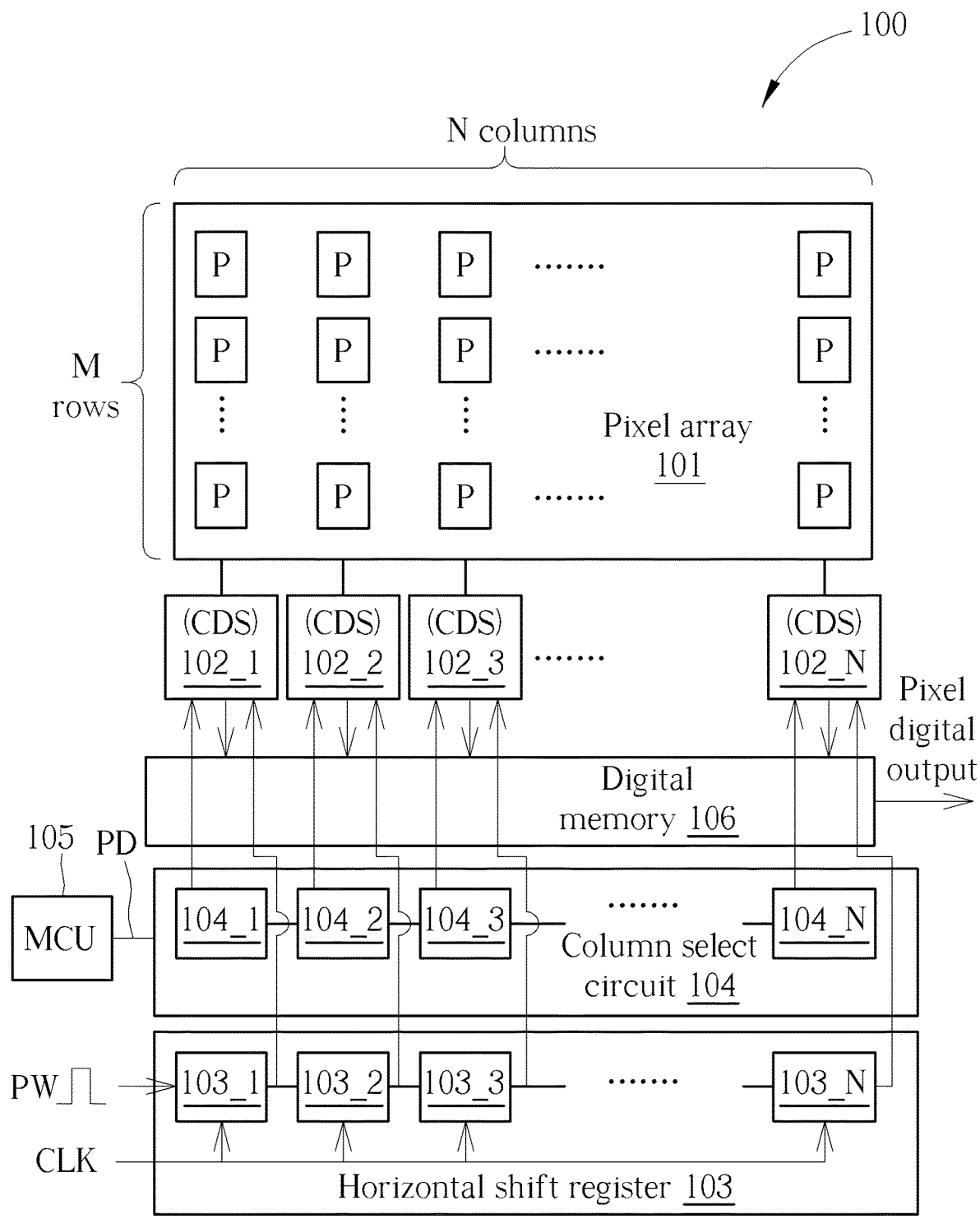
FIG. 2 is a block diagram of the image sensor apparatus 100 according to another embodiment of the invention.

The set of N parallel column readout circuits 102_1-102_N are coupled to the pixel array 101 and respectively correspond to the N columns, and each column readout circuit is arranged for reading out pixel data of one corresponding column. For a column readout circuit 102_X, if the column readout circuit 102_X is enabled and selected, then the column readout circuit 102_X is used to read out pixel data of a corresponding column X wherein X is an integer from one to N. In addition, each column readout circuit in practice is used to read output an analog pixel voltage of one corresponding column, convert the analog pixel value/voltage into a digital pixel value/data, and output the digital pixel value/data to the digital memory 106. In this embodiment, a column readout circuit for example comprises a column-based analog-to-digital converter (CADC). However, this is not intended to be a limitation. A column readout circuit may comprise a correlated double sampling (CDS) circuit which is used to reduce/eliminate circuit offsets in another embodiment; FIG. 2 is a block diagram of the image sensor apparatus 100 according to another embodiment of the invention.

The horizontal shift register 103 is disposed in a row direction, and is coupled to the set of N parallel column readout circuits 102_1-102_N. The horizontal shift register 103 is configured for receiving a pulse signal PW and a clock signal CLK, and for sequentially shifting a phase of the pulse signal PW according to the clock signal CLK, and for scanning a corresponding column according to the shifted phase of the pulse signal PW. The pulse signal PW is generated and outputted by the microcontroller 105, and the clock signal CLK is provided by an oscillator (not shown on FIG. 1) of the image sensor apparatus 100. The pulse signal PW for example carries a pulse, and the horizontal shift register 103 for example has N cascaded latches 103_1-103_N respectively corresponding the N columns. The output of each of the N cascaded latches 103_1-103_N is coupled to a corresponding parallel column readout circuit. The horizontal shift register 103 is sequentially shift the pulse from the latch 103_1 to the latch 103_N one by one according to the timings of the clock signal CLK such as rising edges or falling edges. When such pulse is shifted to a specific latch, a select signal is generated from the specific latch's output to a corresponding column readout circuit of a corresponding column associated with the specific latch to scan the corresponding column. If the corresponding column readout circuit is enabled, then an analog pixel voltage of the corresponding column is processed by the corresponding column readout circuit to generate and output pixel data (such as a pixel bit) of the corresponding column to the digital memory 106. If the corresponding column readout circuit of the corresponding column is disabled, then the corresponding column readout circuit does not process the analog pixel voltage to generate the pixel data of the corresponding column so that no pixel data is outputted from the corresponding column readout circuit.

The operation of enabling or disabling column readout circuits is controlled by the column select circuit 104. The column select circuit 104 has N latches 104_1-104_N which are cascaded and arranged in a specific shift register, and is coupled to the set of N parallel column readout circuits 102_1-102_N. Each of the N latches 104_1-104_N is coupled to one of the N parallel column readout circuits 102_1-102_N and respectively corresponds to one of the N parallel column readout circuits 102_1-102_N. The column select circuit 104 (e.g. the specific shift register) is used for receiving a power down digital control signal PD generated and transmitted from the MCU 105 disposed within the image sensor apparatus 100, and the power down digital control signal PD for example can be used to disable at least one column readout circuit to enable and select a portion of the set of N parallel column readout circuits 102_1-102_N. The column select circuit 104 for example is used to generate a plurality of power down analog control pulses (but not limited) into the set of N parallel column readout circuits 102_1-102_N according to timings of the clock signal.

The power down digital control signal PD may carry different logic levels sequentially at different timings. For example, a high logic/voltage level corresponds to bit '1' while a low logic/voltage level corresponds to bit '0'. The power down digital control signal PD carries information of N bits. When receiving each of the N bits, each of the N latches 104_1-104_N is arranged to shift information of the currently latched bit into a corresponding next-stage latch. Accordingly, after the column select circuit 104 receives the last bit of the N bits, the information of N bits has respectively latched in the N latches 104_1-104_N.

For a latch 104_X among the N latches 104_1-104_N, if a latched information bit of the latch 104_X indicates '1', then the latch 104_X is arranged to generate and output a power down analog control pulse having a high voltage level as a corresponding power down analog control signal of the latch 104_X to a corresponding column readout circuit to select and enable such corresponding column readout circuit. The value of integer X ranges from one to N. Instead, if the latched information bit indicates '0', then the latch 104_X is arranged to generate and output the power down analog control pulse having a low voltage level as the corresponding power down analog control signal of the latch 104_X to the corresponding column readout circuit to disable the corresponding column readout circuit. This operation is also applied for each latch among the N latches 104_1-104_N.

FIGS. 3A-3D are diagrams showing different examples of different modes according to embodiments of the invention. The image sensor apparatus 100 for example comprises a normal mode, WOI mode, Skip2 mode, and Skip4 mode.

Figure 3A:
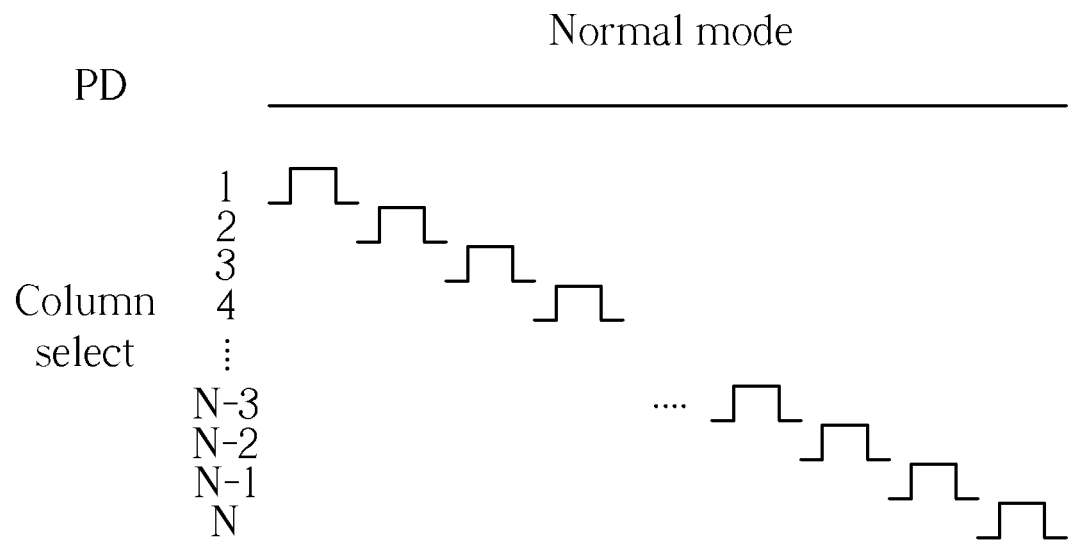
FIG. 3A is a diagram showing an example of a normal mode according to the embodiments of the invention.

As shown in FIG. 3A, in the normal mode, the microcontroller 105 for example may be controlled by a user to generate the power down digital control signal PD carrying information of all the bits indicating '0' to the column select circuit 104, and the column select circuit 104 based on these bits '0' can select and enable all of the N parallel column readout circuits 102_1-102_N. In practice, as shown in FIG. 3A, the N latches 104_1-104_N are arranged to respectively and sequentially generating and outputting power down analog control pulses each having the high voltage level to the N parallel column readout circuits 102_1-102_N to enable all of the N parallel column readout circuits 102_1-102_N.

Figure 3B:
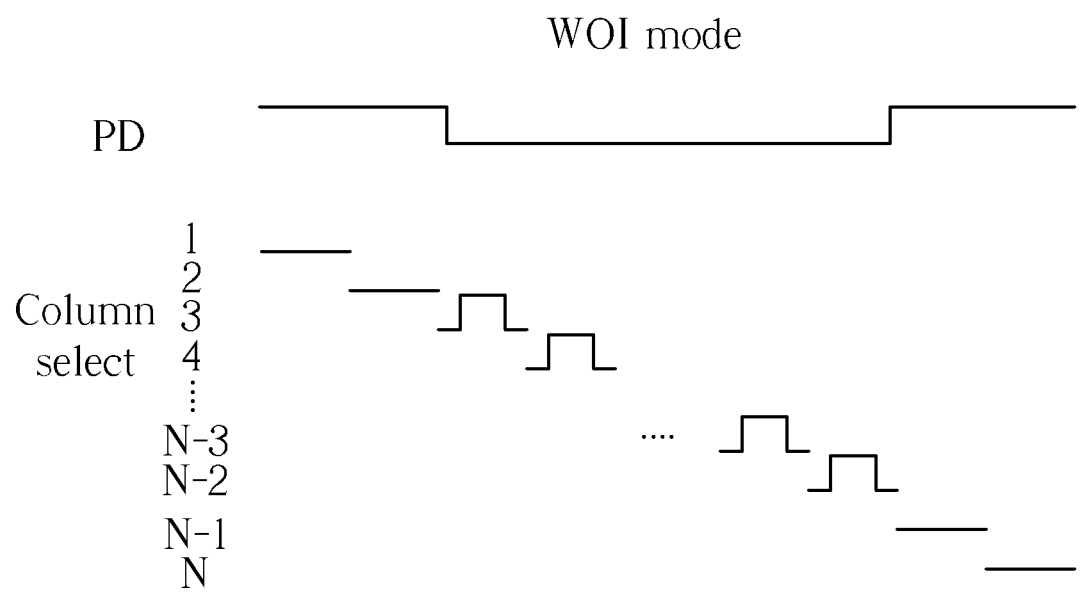
FIG. 3B is a diagram showing an example of a WOI mode according to the embodiments of the invention.

As shown in FIG. 3B, in the WOI (window of interest) mode, the microcontroller 105 can be arranged to enable only column readout circuits corresponding to columns disposed within the window of interest, so that only analog pixel voltages corresponding to columns disposed within the window of interest can be processed to generate digital pixel values to the digital memory 106. In practice, the microcontroller 105 can generate the power down digital control signal PD having the waveform of FIG. 3B carrying information of a set of partial consecutive bits '0' corresponding to columns disposed within the window of interest and other partial bits '1' to the column select circuit 104. Thus, the column select circuit 104 based on these bits can generate power down analog control pulses each having the high voltage level to the column readout circuits corresponding to the columns disposed within the window of interest to select and enable the column readout circuits corresponding to the columns disposed within the window of interest and also to generate power down analog control pulses each having the low voltage level to other column readout circuits to disable the other column readout circuits, so that the analog pixel voltages of only the columns disposed within the window of interest can be read out and processed to generate digital pixel values sequentially.

Figure 3C:
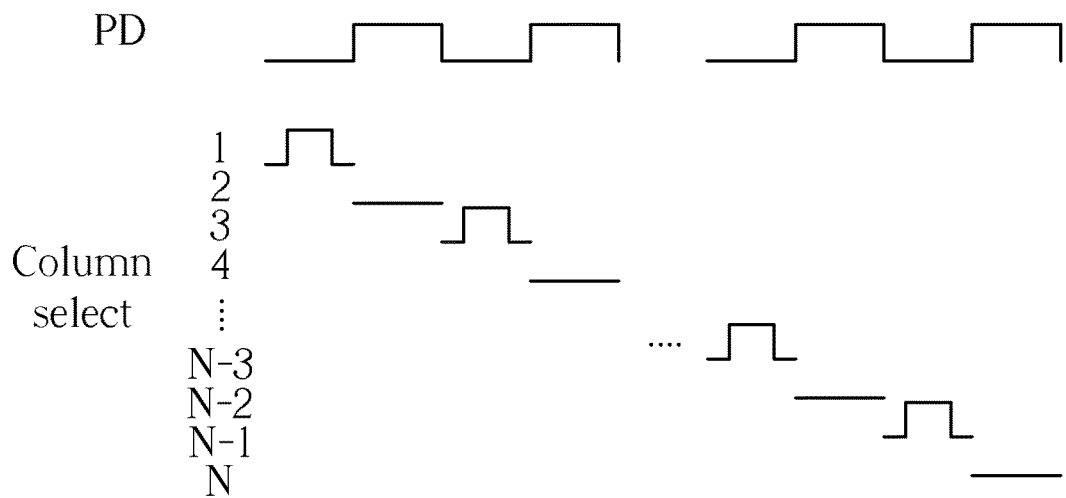
FIG. 3C is a diagram showing an example of a Skip2 mode according to the embodiments of the invention.

As shown in FIG. 3C, in the Skip2 mode, the microcontroller 105 can be arranged to enable column readout circuits corresponding to either all the odd columns or all the even columns, so that only analog pixel voltages corresponding to either all the odd columns or all the even columns can be read out and processed to generate digital pixel values to the digital memory 106 sequentially. For example, the microcontroller 105 can generate the power down digital control signal PD having the waveform of FIG. 3C carrying information of bits such as odd bits indicating '0' and even bits indicating '1' (but not limited) to the column select circuit 104. Thus, the column select circuit 104 based on these bits can generate power down analog control pulses each having the high voltage level to the odd column readout circuits to select and enable the odd column readout circuits and also to generate power down analog control pulses each having the low voltage level to the even column readout circuits to disable the even column readout circuits. This Skip2 mode means that one column is selected/enabled and the other column is not selected/disabled (skipped) for each set of two adjacent columns. In the Skip2 mode, the disabled column readout circuits respectively correspond to a plurality of disabled columns between which one enabled column is disposed. In other example, the microcontroller 105 can generate the power down digital control signal PD carrying information of odd bits indicating '1' and even bits indicating '0' to the column select circuit 104. Thus, the column select circuit 104 based on these bits can correspondingly select and enable the even column readout circuits and disable odd column readout circuits; the detailed description is not described for brevity.

Figure 3D:
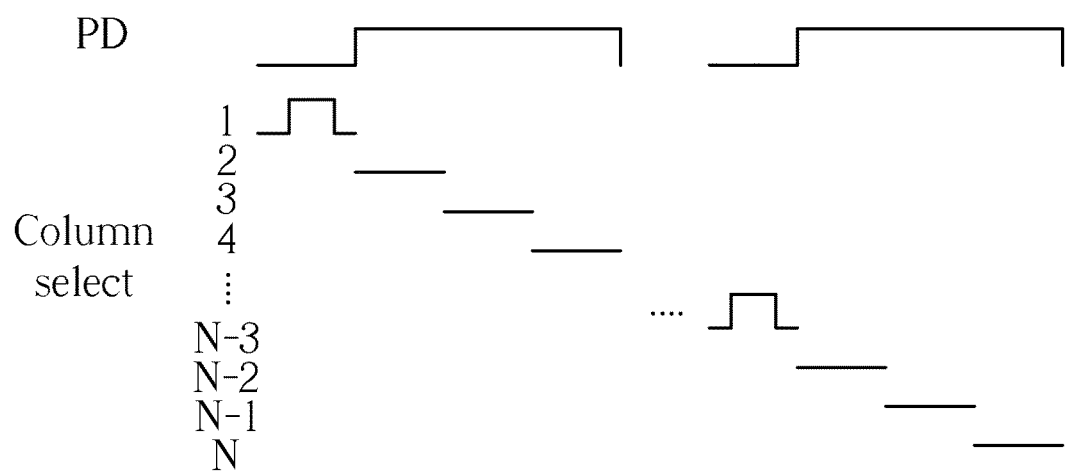
FIG. 3D is a diagram showing an example of a Skip4 mode according to the embodiments of the invention.

As shown in FIG. 3D, in the Skip4 mode, one column is selected and other three columns are not selected (skipped) for each set of four adjacent columns, and the microcontroller 105 can be arranged to enable any one of column readout circuits corresponding to each set of four adjacent columns and disable other three column readout circuits corresponding to each set of four adjacent columns. For example, for each set of four adjacent columns, the microcontroller 105 may enable a column readout circuit corresponding to the first column and disable other three following column readout circuits. In the Skip4 mode, the plurality of disabled column readout circuits respectively correspond to a plurality of disabled columns which are adjacent; the disabled column readout circuits respectively correspond to a plurality of disabled columns between which one enabled column is disposed. This is not intended to be a limitation of the invention. In other modes, the disabled column readout circuits may respectively correspond to a plurality of disabled columns between which multiple enabled columns are disposed.

In practice, the microcontroller 105 may generate the power down digital control signal PD having the waveform of FIG. 3D carrying information of a group of bits each group comprising a bit indicating '0' and three next bits indicating '1' (but not limited) to the column select circuit 104. Thus, the column select circuit 104 based on these bits can generate power down analog control pulses each having the high voltage level to corresponding column readout circuits to select and enable corresponding column readout circuits and also generate power down analog control pulses each having the low voltage level to other column readout circuits to disable the other column readout circuits.

By doing so, even a specific corresponding column is scanned due to the shifted pulse generated by the horizontal shift register 103, the scheme provided by the invention is capable of controlling and determining whether to enable a corresponding column readout circuit to read out and process an analog pixel voltage of the specific corresponding column to generate and output a pixel data of the specific corresponding column. In addition, since the power down digital control signal PD is programmable and can be configured by the MCU 105, the image sensor apparatus 100 can easily implement the programmable column control scheme to significantly improve the efficiency of reading out and processing required analog pixel voltages to generate digital pixel values. In addition, the wasteful power consumption can be reduced since some column readout circuits which are not needed to process analog pixel voltages can be exactly disabled. In addition, compared to the conventional scheme, a column decoder is not required to be implemented in the embodiments of the invention, and the WOI function and Skip function can be easily implemented by using low-cost circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor apparatus, comprising:
a pixel array comprising a plurality of pixel units and arranged in M rows and N columns;
a set of N parallel column readout circuits respectively corresponding to the N columns, each column readout circuit being arranged for reading out pixel data of one corresponding column which is not involved with a decoder used for selecting a column;
a horizontal shift register disposed in a row direction, coupled to the set of N parallel column readout circuits, for receiving a pulse signal and a clock signal, sequentially shifting a phase of the pulse signal according to the clock signal, and for scanning a corresponding column according to the shifted phase of the pulse signal; and
a column select circuit having N latches, coupled to the set of N parallel column readout circuits, each of the N latches respectively corresponding to one of the N parallel column readout circuits, the column select circuit being used for receiving a power down digital control signal transmitted from a microcontroller disposed within the image sensor apparatus, the power down digital control signal is used to disable at least one column readout circuit to enable and select a portion of the set of N parallel column readout circuits;
wherein the N latches of the column select circuit are cascaded-connected and arranged in a specific shift register in which each latch is used to shift information of a latched bit, which is carried in the power down digital control signal, into a corresponding next-stage latch when receiving the latched bit.

2. The apparatus of claim 1, wherein the set of N parallel column readout circuits comprises N column analog-to-digital converters.

3. The apparatus of claim 1, wherein the set of N parallel column readout circuits comprises N parallel correlated double sampling circuits.

4. The apparatus of claim 1, wherein the specific shift register is arranged to receive the clock signal and the power down digital control signal to generate a plurality of power down analog control pulses into the set of N parallel column readout circuits according to timings of the clock signal, to disable the at least one column readout circuit and to enable and select the portion of the set of N parallel column readout circuits.

5. The apparatus of claim 1, wherein the power down digital control signal carries information of N bits each being used for enabling/disable one corresponding column readout circuit.

6. The apparatus of claim 1, wherein the disabled at least one column readout circuit comprises a plurality of disabled column readout circuits respectively corresponding to a plurality of disabled columns which are adjacent.

7. The apparatus of claim 1, wherein the disabled at least one column readout circuit comprises a plurality of disabled column readout circuits respectively corresponding to a plurality of disabled columns between which at least one enabled column is disposed.

8. A method applied in an image sensor apparatus, comprising:
providing a pixel array comprising a plurality of pixel units and arranged in M rows and N columns;
providing a set of N parallel column readout circuits respectively corresponding to the N columns, each column readout circuit being arranged for reading out pixel data of one corresponding column which is not involved with a decoder used for selecting a column;
disposing a horizontal shift register in a row direction coupled to the set of N parallel column readout circuits, to receive a pulse signal and a clock signal, sequentially shift a phase of the pulse signal according to the clock signal, and scan a corresponding column according to the shifted phase of the pulse signal; and
using a column select circuit having N latches coupled to the set of N parallel column readout circuits, to receive a power down digital control signal transmitted from a microcontroller disposed within the image sensor apparatus, wherein each of the N latches respectively correspond to one of the N parallel column readout circuits, and the power down digital control signal is used to disable at least one column readout circuit to enable and select a portion of the set of N parallel column readout circuits;
wherein the N latches of the column select circuit are cascaded-connected and arranged in a specific shift register in which each latch is used to shift information of a latched bit, which is carried in the power down digital control signal, into a corresponding next-stage latch when receiving the latched bit.

9. The method of claim 8, wherein the set of N parallel column readout circuits comprises N column analog-to-digital converters.

10. The method of claim 8, wherein the set of N parallel column readout circuits comprises N parallel correlated double sampling circuits.

11. The method of claim 8, wherein the method further comprises:
receiving the clock signal and the power down digital control signal to generate a plurality of power down analog control pulses into the set of N parallel column readout circuits according to timings of the clock signal, to disable the at least one column readout circuit and to enable and select the portion of the set of N parallel column readout circuits.

12. The method of claim 8, wherein the power down digital control signal carries information of N bits each being used for enabling/disable one corresponding column readout circuit.

13. The method of claim 8, wherein the disabled at least one column readout circuit comprises a plurality of disabled column readout circuits respectively corresponding to a plurality of disabled columns which are adjacent.

14. The method of claim 8, wherein the disabled at least one column readout circuit comprises a plurality of disabled column readout circuits respectively corresponding to a plurality of disabled columns between which at least one enabled column is disposed.

* * * * *